United States Patent
Suh et al.

(10) Patent No.: US 6,921,126 B2
(45) Date of Patent: Jul. 26, 2005

(54) UPPER MOUNTING PART STRUCTURE OF FRONT STRUT ASSEMBLY

(75) Inventors: Jin-Kwan Suh, Gyeonggi-do (KR); Sung-Shik Baik, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/749,247

(22) Filed: Dec. 30, 2003

(65) Prior Publication Data

US 2005/0067858 A1 Mar. 31, 2005

(30) Foreign Application Priority Data

Sep. 30, 2003 (KR) ................................ 10-2003-0067878

(51) Int. Cl.⁷ ............................................ B62D 25/08
(52) U.S. Cl. .............. 296/192; 296/187.09; 296/203.02
(58) Field of Search ............................ 296/192, 187.09, 296/193.09, 203.02; 180/89.1

(56) References Cited

U.S. PATENT DOCUMENTS

| | | | | |
|---|---|---|---|---|
| 4,955,662 A | * | 9/1990 | Kudo | ........................ 296/192 |
| 5,052,742 A | * | 10/1991 | Akoshima et al. | .......... 296/192 |
| 5,411,311 A | * | 5/1995 | Shimmell et al. | ...... 296/203.02 |
| 6,755,461 B2 | * | 6/2004 | Seksaria et al. | ....... 296/193.04 |
| 6,773,057 B2 | * | 8/2004 | Nomura | ...................... 296/198 |
| 2002/0130553 A1 | * | 9/2002 | Kimura | ...................... 307/10.1 |

FOREIGN PATENT DOCUMENTS

| JP | 11-026769 | 1/1999 |
|---|---|---|
| JP | 20025-002537 | 1/2002 |

* cited by examiner

*Primary Examiner*—D. Glenn Dayoan
*Assistant Examiner*—Greg Blankenship
(74) *Attorney, Agent, or Firm*—Morgan Lewis & Bockius LLP

(57) ABSTRACT

An upper mounting part of a front strut assembly adapted to reinforce the rigidity of the periphery of a frontal mounting hole, rear mounting hole, and central mounting hole by a lower cowl panel mounted for integrally welding to the shock absorber housing upper panel placed at both sides of the engine room, and a lower cowl reinforcing means welded onto the lower cowl panel is disclosed. The structure minimizes resonance generated by the load transmitted from the outside of the vehicle, reduces driving noise and improves the vehicle ride and steering.

6 Claims, 2 Drawing Sheets

UPPER MOUNTING PART STRUCTURE OF FRONT STRUT ASSEMBLY

CROSS-REFERENCE TO RELATED APPLICATIONS

This application claims priority of Korean Application No. 10-2003-0067878, filed on Sep. 30, 2003, the disclosure of which is incorporated fully herein by reference in its entirety.

FIELD OF THE INVENTION

The present invention provides an upper mounting part structure of a front strut assembly adapted to reinforce the rigidity of the upper mounting part of the strut assembly, thereby reducing driving noise and improving the ride and steering of the vehicle.

BACKGROUND OF THE INVENTION

Generally, a front strut assembly is used to absorb road shocks and improve a vehicle ride. The lower part of the front strut assembly is coupled to an upper portion of a knuckle, while the upper part of the front strut assembly is coupled to a shock absorber housing upper panel. The rigidity of the shock absorber housing upper panel mounted with the front strut assembly largely affects the ride comfort and driving noise.

SUMMARY OF THE INVENTION

Embodiments of the present invention provide an upper mounting part structure of a front strut assembly adapted to increase the rigidity of a shock absorber housing upper panel mounted with an upper portion of the front strut assembly, thereby minimizing resonance generated via vibration transmitted from the outside of the vehicle, reducing driving noise, and improving the vehicle ride and steering function.

In a preferred embodiment of the present invention, the upper mounting part structure of the front strut assembly comprises a lower cowl panel coupled with an upper side of a shock absorber housing upper panel disposed at both sides of the engine room. A lower cowl reinforcing means is coupled onto the lower cowl panel for reinforcing the rigidity of the lower cowl panel. An upper cowl panel is coupled to an upper portion of the lower cowl reinforcing means.

BRIEF DESCRIPTION OF THE DRAWINGS

For a better understanding of the present invention, reference is made to the following detailed description with the accompanying drawings, in which.

DETAILED DESCRIPTION OF THE PREFERRED EMBODIMENTS

The preferred embodiment of the present invention will now be described in detail with reference to the accompanying drawings.

Figure 1:
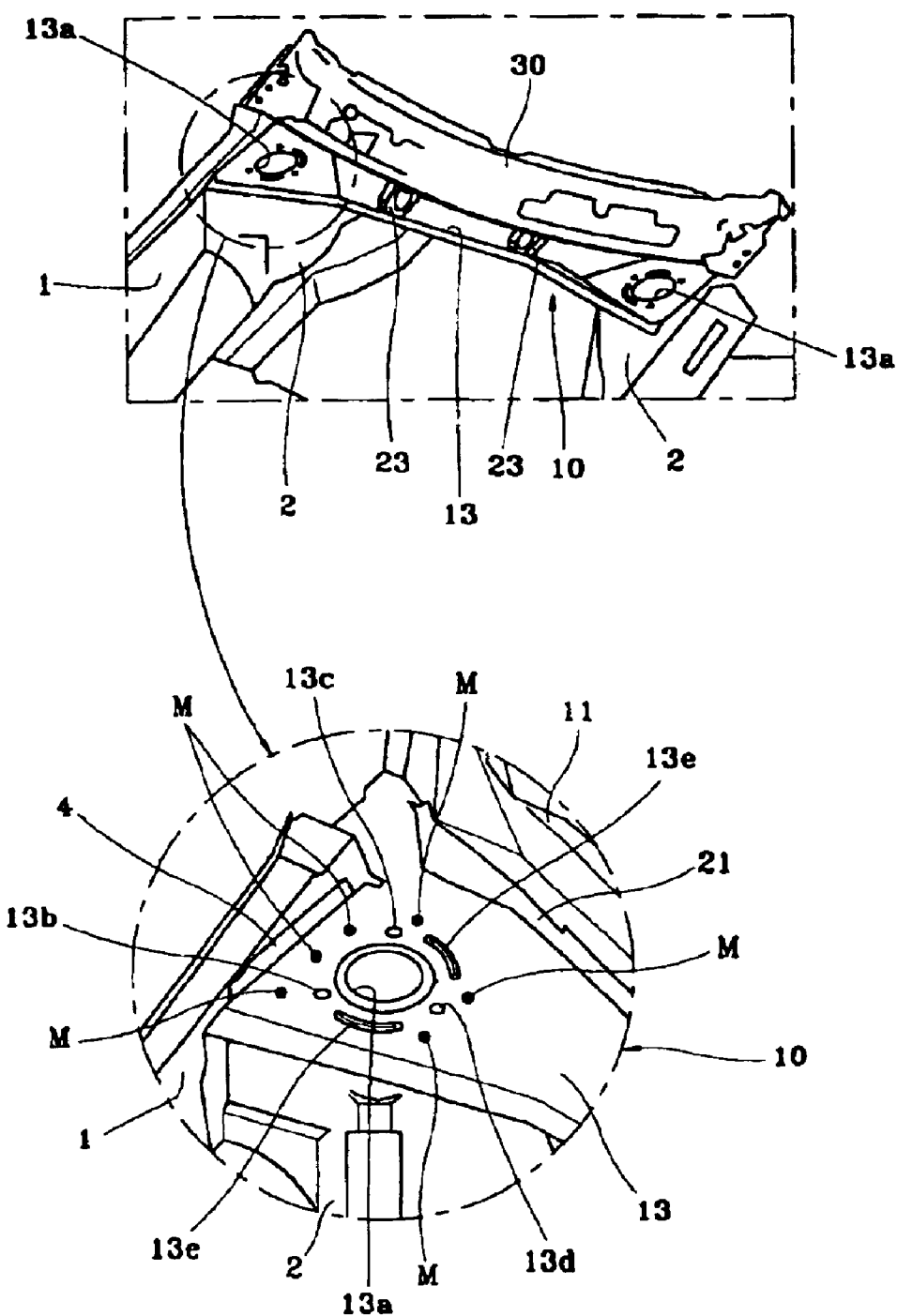
FIG. 1 is a perspective view of an upper mounting part structure of a front strut assembly according to an embodiment of the present invention.
Figure 2:
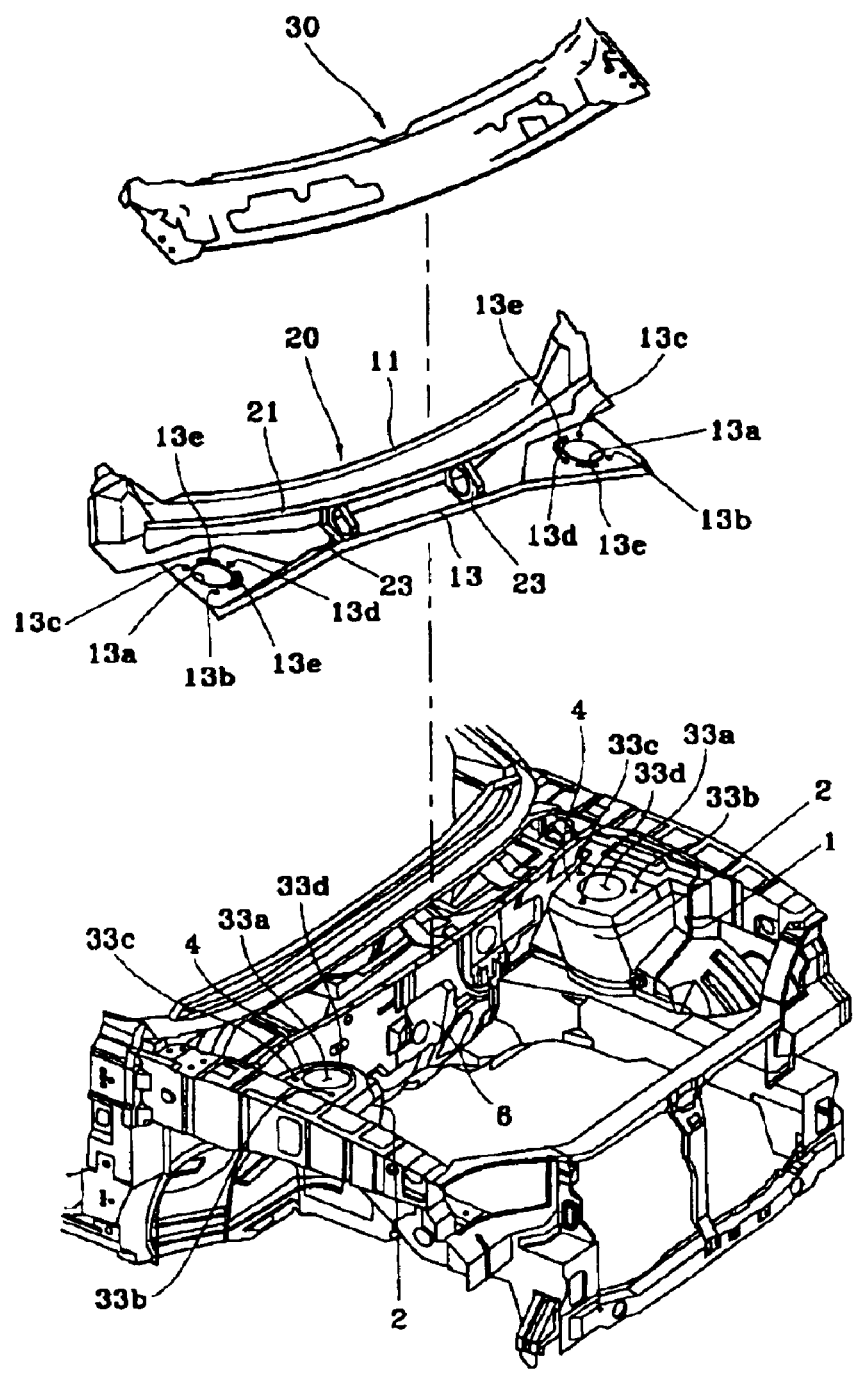
FIG. 2 is an exploded view of components constituting an upper mounting part structure of a front strut assembly according to an embodiment of the present invention.

As shown in FIGS. 1 and 2, an upper mounting part of a front strut assembly comprises a front apron inner panel 1. A front shock absorber housing panel 2 is coupled to an inner side of the front apron inner panel 1 by welding. A shock absorber housing upper panel 4 is formed at an upper side of the front shock absorber housing panel 2. A lower cowl panel 10 is integrally welded onto the shock absorber housing upper panel 4. A lower cowl reinforcing means 20 is welded onto the lower cowl panel 10, and an upper cowl panel 30 overlaps with the lower cowl reinforcing means 20 by welding.

The shock absorber housing upper panel 4 is formed with a central hole 33a under which an upper portion of the front strut assembly is disposed. Three bolt holes into which bolts (not shown) are inserted are formed around the central hole 33a for coupling with the front strut assembly.

The bolt holes refer to a frontal mounting hole 33b formed to face the front of the vehicle, a rear mounting hole 33c formed to face the rear of the vehicle, and a central mounting hole 33d formed therebetween.

The lower cowl panel 10 is integrally constituted by a rear supporting part 11 welding to a dash panel 6 placed at the rear of the engine room, and a frontal supporting part 13 protrusively bent from the rear supporting part 11 to face the front of the vehicle wherein both sides of the frontal supporting part 13 overlap onto the shock absorber housing upper panel 4 respectively by welding. Both sides of the frontal supporting part 13 are formed with a central hole 13a, front mounting hole 13b, rear mounting hole 13c, and central mounting hole 13d that all communicate with holes formed at the shock absorber housing upper panel 4.

In comparison with conventional lower cowl panels, the present invention further includes the frontal supporting part 13 protruding out to face the front of the vehicle, thus both sides of the frontal supporting part 13 are designed to overlap with the upper portion of the shock absorber housing upper panel 4.

The periphery of the frontal mounting hole 13b, rear mounting hole 13c, and central mounting hole 13d of the frontal supporting part 13 are coupled to the shock absorber housing upper panel 4 by a plurality of spot weldings (M).

An arc-shaped reinforcing rib 13e is respectively formed between the frontal mounting hole 13b and central mounting hole 13d, and between the rear mounting hole 13c and central mounting hole 13d. The reinforcing rib 13e increases the rigidity of the periphery of the mounting holes 13b, 13c, and 13d.

The disposition of the reinforcing rib 13e is not limited between the frontal mounting hole 13b and central mounting hole 13d, and between the rear mounting hole 13c and central mounting hole 13d, but may also be formed between the frontal mounting hole 13b and rear mounting hole 13c.

The lower cowl reinforcing means 20 is constituted by a lower cowl reinforcing bracket 21 and two lower cowl reinforcing members 23, wherein the lower cowl reinforcing bracket 21 is lengthily coupled at a central portion of the lower cowl panel 10 along a width direction of the vehicle and its rear side is welded to the front side of the rear supporting part 11, and the two lower cowl reinforcing members 23 are distantly coupled to each other on the frontal supporting part 13 where each members are welded onto a front side of the lower cowl reinforcing bracket 21. The upper cowl panel 30 with the bottom end side thereof, facing the front of the vehicle, overlaps with an upper portion of the lower cowl reinforcing bracket 21 by welding.

The structure according to the present invention is designed to increase the rigidity around the frontal mounting hole 33b, rear mounting hole 33c, and central mounting hole 33d by overlapping both ends of the frontal supporting part 13 onto the shock absorber housing upper panel 4 via a plurality of spot weldings (M). The reinforcing rib 13e is further formed between the frontal mounting hole 13b and central mounting hole 13d, and between the rear mounting hole 13c and central mounting hole 13d, thereby greatly strengthening the rigidity around the mounting holes 33b, 33c, and 33d.

As apparent from the foregoing, there is an advantage in the present invention in that the periphery of the frontal mounting hole, rear mounting hole, and central mounting hole coupled to the upper portion of the strut assembly are increased in rigidity, thereby contributing to minimization of resonance generated by load transmitted from the outside of the vehicle, reduction of driving noise, and improvement of the vehicle ride and steering.

What is claimed is:

1. An upper mounting part structure of a front strut assembly, comprising:
    a lower cowl panel coupled to an upper side of a shock absorber housing upper panel disposed at both sides of an engine room;
    lower cowl reinforcing means coupled to said lower cowl panel for reinforcing the rigidity of said lower cowl panel; and
    an upper cowl panel coupled to an upper portion of said lower cowl reinforcing means, wherein said lower cowl panel comprises
    a rear supporting part welded to a dash panel disposed at the rear of the engine room; and
    a frontal supporting part protruding out from said rear supporting part to face the front of the vehicle and both sides thereof overlapped onto the upper side of said shock absorber housing upper panel respectively by welding.

2. The structure of claim 1, wherein both sides of said frontal supporting part are formed with a central hole, frontal mounting hole, rear mounting hole, and central mounting hole, that all communicate with holes formed at said shock absorber housing upper panel respectively.

3. The structure of claim 2, wherein the periphery of said frontal mounting hole, rear mounting hole, and central mounting hole are coupled to said shock absorber housing upper panel by a plurality of spot weldings.

4. The structure of claim 2, wherein an arc-shaped reinforcing rib is respectively formed between said frontal mounting hole and said central mounting hole, and between said rear mounting hole and said central mounting hole.

5. The structure of claim 1, wherein said lower cowl reinforcing means is comprises:
    a lower cowl reinforcing bracket coupled at a central portion of said lower cowl panel along a width direction of the vehicle, the rear portion of said lower cowl reinforcing bracket welded onto the front side of said rear supporting part; and
    a plurality of lower cowl reinforcing members distantly coupled to each other on said frontal supporting part, each member welded onto the front side of said lower cowl reinforcing bracket.

6. The structure of claim 5, wherein said upper cowl panel overlaps with the upper portion of said lower cowl reinforcing bracket.

* * * * *